United States Patent [19]

Rushmere et al.

[11] Patent Number: 5,707,494

[45] Date of Patent: Jan. 13, 1998

[54] PROCESS FOR PREPARING WATER SOLUBLE POLYALUMINOSILICATES

[75] Inventors: John Derek Rushmere, Wilmington, Del.; Robert Harvey Moffett, Landenberg, Pa.

[73] Assignee: E. I. Du Pont de Nemours and Company, Wilmington, Del.

[21] Appl. No.: 779,099

[22] Filed: Jan. 6, 1997

Related U.S. Application Data

[63] Continuation-in-part of Ser. No. 568,068, Dec. 6, 1995, Pat. No. 5,626,721, which is a continuation-in-part of Ser. No. 515,789, Aug. 16, 1995, Pat. No. 5,543,014, which is a continuation-in-part of Ser. No. 347,232, Nov. 23, 1994, Pat. No. 5,470,435, which is a division of Ser. No. 212,744, Mar. 14, 1994, Pat. No. 5,482,693.

[51] Int. Cl.$^6$ .................................................. D21H 21/10

[52] U.S. Cl. ...................... 162/181.6; 162/164.1; 162/164.3; 162/168.1; 162/168.2; 162/168.3; 162/183

[58] Field of Search ............... 162/181.6, 181.2, 162/164.1, 164.3, 164.6, 168.2, 168.3, 175, 178, 183

[56] References Cited

U.S. PATENT DOCUMENTS

| | | | |
|---|---|---|---|
| 4,954,220 | 9/1990 | Rushmere | 162/181.6 |
| 5,127,994 | 7/1992 | Johansson | 162/168.3 |
| 5,176,891 | 1/1993 | Rushmere | 423/328.1 |
| 5,543,014 | 8/1996 | Rushmere et al. | 162/181.6 |

Primary Examiner—Peter Chin

[57] ABSTRACT

An improved method for the production of water soluble polyaluminosilicate microgels, formed by the reaction of solutions of alkali metal silicates with solutions of acids containing dissolved aluminum compounds, is provided.

4 Claims, No Drawings

PROCESS FOR PREPARING WATER SOLUBLE POLYALUMINOSILICATES

CROSS REFERENCE TO RELATED APPLICATIONS

This application is a continuation-in-part of application, Ser. No. 08/568,068, filed Dec. 6, 1995 now U.S. Pat. No. 5,626,721, which, in turn, was a continuation-in-part of Ser. No. 08/515,789, filed Aug. 16, 1995 now U.S. Pat. No. 5,543,014, which, in turn, was a continuadon-in-part of Ser. No. 08/347,232, filed Nov. 23, 1994, now U.S. Pat. No. 5,470,435, which was a division of Ser. No. 08/212,744, filed Mar. 14, 1994 now U.S. Pat. No. 5,482,693.

FIELD OF THE INVENTION

This invention relates to water soluble polyaluminosilicate microgels and specifically to an improved process for making them.

BACKGROUND OF THE INVENTION

The formation of water soluble polyaluminosilicate microgels and their use in papermaking is known. U.S. Pat. No. 5,176,891 discloses a process for their production involving the initial formation of a polysilicic acid microgel followed by reaction of the polysilicic acid microgel with an aluminate to form the polyaluminosilicate. The use of the polyaluminosilicate microgels as improved retention and drainage agents in papermaking is also disclosed. U.S. Pat. No. 5,127,994 discloses a process for the production of paper by forming and dewatering a cellulosic fiber suspension in the presence of three compounds: an aluminum salt, a cationic polymeric retention agent and polysilicic acid.

The polyaluminosilicate microgel process disclosed in U.S. Pat. No. 5,176,891 comprises three steps, namely, (1) the acidification of a water solution of an alkali metal silicate to form polysilicic acid microgel, (2) addition of a water soluble aluminate to the polysilicic acid microgel to form the polyaluminosilicate and (3) dilution to stabilize the product against gelation. There is a necessary aging period involved following the acidification step during which the silicic acid first formed polymerizes to linear polysilicic acid and then to the microgel structure which is critical to the performance of the polyaluminosilicate products. The products are described as having a surface area of greater than 1000 square meters per gram, a surface acidity of greater than about 0.6 milliequivalents per gram and an alumina/silica mole ratio of greater than 1:100, preferably between 1:25 and 1:4.

The method of the present invention is an improvement over the process described in the '891 patent in that it combines the acidification and alumination steps. An unexpected and important benefit resulting is that the aging period required for microgel formation to occur is significantly reduced. The polyparticulate polyaluminosilicate products produced by the process of this invention have good activity as retention and drainage agent in paper making immediately on formation (no aging period) and they reach their optimum performance in significantly less time than those prepared by previous methods. Aging periods required for product formation are avoided or minimized whenever possible in paper making since they require additional or oversized equipment and are known to give rise to problems such as products of uneven quality. Any reduction in the aging period is thus an improvement in the process of paper making and in product quality.

SUMMARY OF THE INVENTION

The process of this invention for making paper comprises the steps of
(a) adding to an aqueous paper furnish containing pulp and optionally inorganic filler 0.01–1% by weight, based on the dry weight of the furnish, of a water soluble polyparticulate polyaluminosilicate microgel having a mole ratio of alumina:silica of between 1:10 and 1:1500 prepared by a process comprising the steps of
  (i) acidifying an aqueous solution of an alkali metal silicate containing 0.1–6% by weight of $SiO_2$ to a pH of 2–10.5 by adding an aqueous acidic solution containing sufficient aluminum salt to provide said mole ratios; and
  (ii) diluting the product of step (i) with water prior to gelation to a $SiO_2$ content of $\leq 2\%$ by weight; and at least approximately 0.001% by weight based on the dry weight of the famish of a water soluble cationic polymer;
wherein the microgel has an average particle size of 50–250 nm; and
(b) forming and drying the product of step (a).

DETAILED DESCRIPTION OF THE INVENTION

An important aspect of the process of this invention is the addition of a water soluble aluminum salt to an acid used for the acidification of an alkali metal silicate solution. This way, hydrated aluminum hydroxide is produced at the same time as silicic acid and thus, during the polymerization of silicic acid to polysilicic acid and formation of a polyparticulate microgel, aluminum hydroxide is incorporated directly into the polymer with the attendant formation of polyaluminosilicate. This process can produce useful polyaluminosilicates (PAS) over a wide range of compositions having alumina/silica mole ratios ranging from approximately 1:1500 to 1:10 but generally about 1:1000 or less, preferably 1:750 to 1:25 and most preferably 1:500 to 1:50. Because of the low alumina/silica ratio, the total surface acidity of the polyaluminosilicates does not differ significantly from that of non-aluminated polysilicate microgels. At the same time an anionic charge is maintained into lower pH ranges than is observed with non-aluminated polysilicic acid.

The process of this invention can be carried out as a two-step process comprising
(a) acidifying an aqueous solution of an alkali metal silicate containing 0.1–6% by weight of $SiO_2$ to a pH of 2–10.5 by using an aqueous acidic solution containing an aluminum salt; and
(b) diluting the product of step (a) with water prior to gelation to a $SiO_2$ content of $\leq 2\%$ by weight.

Optionally, after the acidification step, an aging step can be employed to improve product performance further. Such an aging period is not required and is somewhat counter to the benefit gained from the process of this invention, a reduction in the time required for the polyaluminosilicate products to reach maximum activity. The aging period, if employed, can be any period of time up to that required for the gelation of the reaction mix. This can vary from seconds to hours depending on the particular reaction conditions employed.

Any water soluble silicate salt can be used in the present process, alkali metal silicates such as sodium silicate being preferred. As an example, sodium silicate, $Na_2O:3.2SiO_2$, by weight, can be used.

Any acid with a pKa less than about 5 can be used. Inorganic mineral acids are preferred over organic acids; sulfuric acid is the most preferred.

Any aluminum salt can be used which is soluble in the acid used. Suitable choices are aluminum sulfate, chloride, nitrate and acetate. Basic salts such as sodium aluminate and chlorohydrol, $Al(OH)_2Cl$, can also be used. If alkali metal aluminates are used, they can be first converted to an aluminum metal salt by reaction with the acid.

To carry out the process of the invention, a dilute aqueous solution of an alkali metal silicate, containing from about 0.1–6 wt % $SiO_2$, preferably about 1–5 wt % $SiO_2$ and most preferably 2–4 wt %, is rapidly mixed with a dilute aqueous solution of an acid containing a dissolved aluminum salt so as to produce a solution within a pH range of about 2–10.5. A more preferred pH range is from 7–10.5 with the most preferred range being pH 8–10. Suitable acid concentrations range from 1–50 wt % although both lower and higher concentrations can be used provided adequate mixing is employed. Generally a concentration of about 20 wt % acid is preferred. The amount of aluminum salt dissolved in the acid solution can vary from about 0.1 wt % up to the limit of solubility of the salt in the acid.

The mole ratio of $Al_2O_3/SiO_2$ in the polyaluminosilicate microgels produced by the process of this invention can vary widely from about 1:500 to 1:10 depending upon the concentration of the acid used, the amount of aluminum salt dissolved in the acid and the pH of the resulting partially neutralized silicate solution. Acidification into lower pH ranges requires the use of more acid and can result in the production of polyaluminosilicates containing higher alumina/silica mole ratios. Solubility data of an $Al_2(SO_4)_3$—$H_2SO_4$—$H_2O$ system (Linke, "Solubility of Inorganic Compounds", 4th Ed. 1958, Vol. 1) provide a basis for calculating the maximum $Al_2O_3/SiO_2$ ratios obtainable in polyaluminosilicates (when using $Na_2O:3.2SiO_2$ as the silicate) using sulfuric acid solutions containing from 10–50 wt % acid, saturated with aluminum sulfate, for the acidification of a silicate solution to pH 9. (At this pH, approximately 85% of the alkalinity of $Na_2O:3.2SiO_2$ is neutralized.)

| $H_2SO_4$ Wt % | $Al_2(SO_4)_3$ Wt % | Polyaluminosilicate $Al_2O_3/SiO_2$ mole ratio |
|---|---|---|
| 10 | 19.6 | 1/22 |
| 20 | 13.3 | 1/32 |
| 30 | 8.1 | 1/61 |
| 40 | 4.3 | 1/138 |
| 50 | 2.5 | 1/283 |

It has been found that the process of preparing PAS microgels can preferably be carried out using an acid solution containing about 20 wt % sulfuric acid and from 1–6 wt % of dissolved aluminum sulfate. Using such acid solutions over the preferred pH range of 8–10 (representing approximately 95–60 wt % neutralization of $Na_2O:3.2SiO_2$), polyaluminosilicate microgels with $Al_2O_3/SiO_2$ mole ratios of from about 1:35 to 1:400 can be obtained. Within the preferred concentration and pH ranges, the polyaluminosilicate solutions are clear and, after dilution to about 0.5 wt % $SiO_2$, retain their activity in flocculation processes for about 24 hours.

The activity of the polyaluminosilicate microgels can be further improved and this activity can be maintained for longer periods of time by adjusting the microgel pH to about pH 1 to 4 before, after or concurrently with the dilution step. Another advantage of adjusting the microgel pH to about pH 1–4 is that the microgels can be stored at higher silica concentrations. Thus it can be possible to eliminate the dilution step completely depending on the silica concentration during the addition of the aqueous acidic solution of an aluminum salt. The adjustment of pH to between about 1–4 permits storing polyaluminosilicate microgels at up to 4–5 weight %. Any acid that will lower the microgel pH to about pH 1–4 can be used. Inorganic mineral acids are preferred over organic acids; sulfuric acid is the most preferred.

Maximum performance of the polyaluminosilicate microgels has been found to occur when the average particle (microgel) size or dimension is between 20 and 250 nanometers and preferably from about 50–150 nm. This size range can be reached at different aging times depending upon the process conditions (pH, silica concentration, aluminum concentration, temperature) selected. It has also been found that non-aluminized polysilicate microgels also have maximum performance when the average particle (microgel) size is between 20 and 250 nanometers.

The polyaluminosilicates produced by the process of this invention can be utilized in a wide variety of flocculation processes and act as retention and drainage agents in paper making (used in the amount of 0.01–1% by weight, based on the dry weight of the paper furnish). They are employed in combination with cationic polymers such as cationic starch, cationic polyacrylamide and cationic guar. These are described in U.S. Pat. No. 4,927,498 and U.S. Pat. No. 5,176,891. Such (water soluble) cationic polymers are present to the extent of at least about 0.001 weight % based on the dry weight of the furnish. Anionic polymers such as ionic polyacrylamide, anionic starches, anionic guar, anionic polyvinyl acetate and carboxymethylcellulose and its derivatives can also be used in conjunction with the polyaluminosilicate microgels and cationic polymers with beneficial results. Depending on the papermaking conditions, various other chemicals can also be employed in conjunction with the polyaluminosilicate microgels and high molecular weight cationic polymers. In systems containing large amounts of anionic trash, for example, low molecular weight, high charge-density cationic polymers such as polyethyleneimine, polydiallyldimethylammonium chloride and amine-epichlorohydrin condensation products can be added to achieve a charge balance within the system more effectively and obtain improved results. Additional quantities of aluminum salts beyond those contained in the acidic solution, such as alum and sodium aluminate, can also be added for improved results in certain circumstances. These can be added to the papermaking furnish either by premixing with the polyaluminosilicate microgels of this invention or by separate addition.

EXAMPLE 1

Preparation of PAS Microgel 300 g of a water solution of sodium silicate ($Na_2O:3.2SiO_2$) containing 4 wt % $SiO_2$ was acidified to pH 10 using 20 wt % sulfuric acid containing 1.5 wt % of aluminum sulfate $[Al_2(SO_4)_3]$. The acid was added from a burette into the silicate solution stirred with a magnetic stirrer. The polyaluminosilicate product had an $Al_2O_3/SiO_2$ mole ratio of 1:251 as calculated from the amount of aluminum sulfate-containing acid solution used. Immediately after completion of the addition, a sample was removed and diluted to 0.5 wt % of silica. Further samples were taken and diluted after the polyaluminosilicate microgel had aged for 2, 7, 36, 96 and 156 minutes, respectively, and the diluted samples evaluated for drainage performance.

For comparative purposes, a polyaluminosilicate of equivalent composition was prepared according to the method described in U.S. Pat. No. 5,176,891, as follows: 300 g of the same 4 wt % $SiO_2$-containing sodium silicate solution was acidified to pH 10 using 20 wt % sulfuric acid only. The polysilicate microgel formed was sampled (and diluted 0.5 wt %) on the same time schedule as above. Prior to evaluation it was converted to a polyaluminosilicate having an $Al_2O_3/SiO_2$ mole ratio of 1:251 by the addition of sufficient amount of sodium aluminate solution to obtain the desired ratio.

All samples were evaluated for drainage performance by Canadian Standard Freeness tests using an alkaline furnish of 0.4 wt % consistency containing 80% bleached Kraft pulp (50% hardwood/50% softwood) and 20% precipitated calcium carbonate. pH was 8.06. For drainage measurements, a standard addition of 20 lb/t (dry furnish weight basis) of cationic potato starch (DS=0.03) followed by 2 lb/t ($SiO_2$ basis) of the various polyaluminosilicate samples were made to 1 l of furnish contained in a Britt jar stirred with a mechanical stirrer at 1000 rpm (in order to flocculate the furnish prior to the drainage test). The flocculated furnish was then transferred to a cup of a Canadian Standard Freeness tester and the drainage measurements were made. Table 1 gives the results obtained.

TABLE 1

| PAS Microgel Age | Freeness (ml) | |
| --- | --- | --- |
| (minutes) | This Invention | '891 patent |
| 0 | 605 | 520 |
| 2 | 650 | 585 |
| 7 | 655 | 605 |
| 36 | 670 | 640 |
| 96 | 660 | 650 |
| 156 | 650 | 630 |

The results demonstrate that the polyaluminosilicate produced by the process of this invention unexpectedly achieved approximately 90% of its maximum activity immediately after preparation compared to approximately only 80% of maximum activity for the prior art polyaluminosilicate. Also and again unexpectedly, an improved performance was maintained throughout the aging period. The polyaluminosilicate of this invention reached its maximum activity in a shorter period of time than that prepared using the prior art method (36 minutes versus 96 minutes) and attained a higher freeness value (670 versus 650 ml).

It is believed that such improved performance, especially the reduced time required to reach maximum activity, although not a priori predictable, may be due to the catalytic effect of the presence of the aluminum salt throughout the formation of the particles in the 1–2 nm diameter range and of the microgel structure. The aluminum ions are expected to be present both within as well as on the surface of the particles, i.e., intra- and inter-particle.

EXAMPLE 2

Preparation of PAS Microgels

Four separate polyaluminosilicate samples having differing $Al_2O_3/SiO_2$ mole ratios were prepared as follows:

Four 300-g aliquots of a 4 wt % $SiO_2$ solution (as $Na_2O:3.2SiO_2$) were acidified to pH 10 with 20 wt % sulfuric acid containing varying amounts of dissolved aluminum sulfate. By varying the amount of dissolved aluminum sulfate from 1–6 wt %, products with alumina/silica mole ratios between 1:78 and 1:248 were obtained as calculated from the amount of acid used to reach pH 10 and the known amount of aluminum sulfate dissolved in the acid. After preparation, each product was aged for two minutes, then diluted to 1 wt % $SiO_2$ content and examined for anionic charge by means of an Electrokinetic Sonic Amplitude device (Matec Instruments Inc., Hopkinton, Mass. 01748). Thereafter, the polyaluminosilicate was titrated with 1N hydrochloric acid to the pH of zero charge and thus the anionic pH range determined.

A control polysilicic acid microgel (without any aluminum) was also prepared using 20 wt % sulfuric acid for the acidification and examined similarly. The results are given in Table 2; wherein the zero charge pH is that pH where the particle surface is electrically uncharged. A lower zero charge pH, achieved by the PAS microgels of this invention, means that such particles carry an anionic charge in a broader pH range and, therefore, can be utilized as retention and drainage aids under the more widely varied conditions of both acid and alkaline paper making.

TABLE 2

Zero charge pH of polyaluminosilicates

| $Al_2O_3/SiO_2$ mole ratio | Zero Charge pH |
| --- | --- |
| 0 (Control, PSA) | 6.45 |
| 1:248 | 5.54 |
| 1:190 | 4.92 |
| 1:129 | 4.25 |
| 1:76 | 3.82 |

EXAMPLE 3

Preparation of Various PAS Microgels—A Comparison

In this test series, several different silicate microgels were produced to compare various prior art processes to the process of producing PAS microgels of this invention to determine the aging time required to reach maximum activity and to measure ultimate performance. Included in this test were several controls.

All of the products were evaluated for drainage performance by Canadian Standard Freeness tests using an alkaline furnish of 0.3 wt % consistency at pH 7.5. The furnish contained 70% bleached Kraft pulp (80% hardwood/20% softwood) and 30% precipitated calcium carbonate. All additions to the furnish were made in a Britt jar stirred with a mechanical stirrer at 750 rpm in order to flocculate the furnish prior to the drainage tests. Product performance was tested by adding to a paper furnish 20 lb/t (dry furnish weight basis) of cationic potato starch (DS=0.03), alum $[Al_2(SO_4)_3 \cdot 18H_2O]$ solution, when utilized, at the ratios indicated below and 2 lb/t ($SiO_2$ basis) of the product being tested.

Additions of various ingredients to a Britt jar were made 15 seconds apart. Mixing was stopped 15 seconds after the addition of the product test samples. The flocculated furnish was then transferred to a Canadian Standard Freeness tester and drainage measurements were made. Water collected from the freeness tester was measured for turbidity as an indication of the effectiveness of the samples to aid retention of the pulp fiber and filler.

Test Sample A was produced by deionizing a 292-g water solution of sodium silicate ($Na_2O:3.2SiO_2$) containing 5 wt % $SiO_2$ with 200 g of Dowex® 50W-8X $H^+$ Form resin. The resin was added to the well stirred water solution batch-wise. The resin was removed by filtration 3 minutes after the mixture reached pH=3.0. Aliquots were removed at the times shown in Table 3; zero time being when the mixture reached pH=3.0. Each aliquot was then immediately diluted to 0.125 wt % $SiO_2$ to prevent further microgel formation and was added to a paper furnish as described above (test A1).

Test Sample B was produced by deionizing a 300.5-g water solution of sodium silicate containing 2 wt % $SiO_2$ with 100 g of Dowex® 50W-SX $H^+$ Form resin. The resin was added to the well stirred water solution batch-wise. The resin was removed by filtration 3 minutes after the mixture reached pH=3.0. Aliquots were removed at the times shown in Table 3; zero time being when the mixture reached pH=3.0. Each aliquot was then immediately diluted to 0.125 wt % $SiO_2$ for use in tests B1 and B2. (In test B1 no alumina was present in the furnish while in test B2, sufficient alum was added to the furnish to provide a 1:100 $Al_2O_3/SiO_2$ molar ratio.) An identical set of aliquots was removed as above and immediately diluted to 0.5 wt % $SiO_2$. Sufficient amounts of sodium aluminate solution (0.5 wt % $Al_2O_3$) were added to these diluted aliquots to give a 1:100 $Al_2O_3/SiO_2$ molar ratio. These aliquots were used in test B3.

Test Sample C was prepared by adding 12.5 ml of 5N sulfuric acid to a 291-g water solution of sodium silicate containing 2 wt % $SiO_2$ to obtain a pH of 3.1. Aliquots were removed and diluted to 0.125 wt % $SiO_2$ for use in tests C1 and C2. (In test C1 no alumina was present in the furnish while in test C2, sufficient alum was added to the furnish to provide a 1:100 $Al_2O_3/SiO_2$ molar ratio.) An identical set of aliquots was removed as above and immediately diluted to 0.5 wt % $SiO_2$. Sufficient amounts of sodium aluminate solution (0.5 wt % $Al_2O_3$) were added to these diluted aliquots to give a 1:100 $Al_2O_3/SiO_2$ molar ration and used in test C3.

Test Sample D was prepared by adding 10.0 ml of 5N sulfuric acid to a 291-g water solution of sodium silicate containing 2 wt % $SiO_2$ to afford a pH value of 9.0. Aliquots were removed and diluted to 0.125 wt % $SiO_2$ for use in tests D1. In test D1 no alumina was present in the furnish.

Test Sample E was prepared utilizing the process of this invention by adding 10.0 ml of 5N sulfuric acid in which 0.68 g of aluminum sulfate $[Al_2(SO_4)_3.18H_2O]$ had been dissolved to a 291-g water solution of sodium silicate containing 2 wt % $SiO_2$ to afford a pH of 8.0. The resulting polyaluminosilicate had a calculated $Al_2O_3/SiO_2$ molar ratio of 1:100. Aliquots were removed and diluted to 0.125 wt % $SiO_2$ for use in Test E1 as described above.

Test Sample F was prepared utilizing the process of this invention by adding 10.0 ml of 5N sulfuric acid in which 0.055 g of aluminum sulfate $[Al_2(SO_4)_3.18H_2O]$ had been dissolved to a 291-g water solution of sodium silicate containing 2 wt % $SiO_2$ to afford a pH of 8.9. The resulting polyaluminosilicate had a calculated $Al_2O_3/SiO_2$ molar ratio of 1:1275. Aliquots were removed and diluted to 0.125 wt % $SiO_2$ for use in Test F1. The furnish contained sufficient alum to provide a final $Al_2O_3/SiO_2$ molar ratio of 1:100.

Tests G through J were carried out as controls. Test G used only cationic potato starch as a drainage aid. Test H used cationic potato starch and alum ($Al_2O_3$ at dosage equivalent to test J). Test I used cationic potato starch and commercial BMA-0 colloidal silica (5 nanometer spherical particles). Test J used cationic potato starch, alum, and BMA-0 colloidal silica ($Al_2O_3/SiO_2$ ratio=1/100). All data are shown in Table 3.

As can be seen from Table 3, PAS microgels prepared using the process of this invention (Tests E1 and F1) reached their maximum activity faster, as measured by freeness and turbidity determinations in a paper making process than those prepared by methods disclosed in the prior art, viz., U.S. Pat. No. 5,176,994 (Tests B2 and C2); U.S. Pat. No. 5,176,891 and U.S. Pat. No. 4,927,498 (Tests B3 and C3); and U.S. Pat. No. 4,954,220 (Tests A1, B1, C1 and D1). PAS microgels of this invention also showed superior results in paper making after a 5-min. aging period than those of the prior art. These microgels gelled prior to the 1-hr. measurements; can be diluted from 2% to 0.5% ($SiO_2$) to prevent gelation. The PAS microgels of this invention also were shown to be superior to the controls (Tests G, H, I and J).

TABLE 3

FREENESS/TURBIDITY vs. AGE TIME

| TEST | 1 MIN | 5 MIN | 1 HOUR | 4 HOUR | 24 HOUR |
| --- | --- | --- | --- | --- | --- |
| A1 | 470/83 | 470/78 | 500/65 | 500/61 | 585/28 |
| B1 | 410/111 | 435/111 | 435/103 | 425/110 | 475/61 |
| B2 | 440/96 | 440/102 | 450/98 | 475/77 | 540/39 |
| B3 | 486/67 | 495/63 | 475/83 | 480/69 | 520/49 |
| C1 | 400/125 | 420/121 | 425/116 | 405/126 | 420/109 |
| C2 | 410/122 | 430/119 | 420/123 | 420/127 | 420/102 |
| C3 | 420/116 | 420/122 | 415/119 | 415/108 | 460/66 |
| D1 | 490/62 | 570/39 | 630/21 | 615/21 | 555/29 |
| E1 | 510/58 | 620/26 | GELLED | ~20 MIN | |
| F1 | 580/28 | 650/21 | GELLED | ~75 MIN | |

| TEST | FREENESS/ TURBIDITY |
| --- | --- |
| G | 380/154 |
| H | 390/131 |
| I | 456/72 |
| J | 510/49 |

EXAMPLE 4

In this test series, two different silicate microgels were prepared to show that the incorporation of aluminum into the microgel structure as described herein affords polyaluminosilicate microgels which are superior retention and drainage agents in paper furnishes below pH 7 when compared to polysilicate microgels without aluminum.

These products were evaluated for drainage performance by Canadian Standard Freeness tests using a furnish of 0.3 wt % consistency. The furnish contained 80% bleached Kraft pulp (80% hardwood/20% softwood) and 20% Kaolin clay. The pH of the furnish was adjusted prior to each test as shown in Table 4. All additions to the furnish were made in a Britt jar stirred with a mechanical stirrer at 750 rpm in order to flocculate the furnish prior to the drainage tests. Product performance was tested by adding to a paper furnish 40 lb/t (dry furnish weight basis) of cationic potato starch (DS=0.03) and 2 lb/t ($SiO_2$ basis) of the product being tested.

Additions to a Britt jar were made 30 seconds apart. Mixing was stopped 15 seconds after the addition of the product test samples. The flocculated furnish was then transferred to a Canadian Standard Freeness tester and drainage measurements were made. Water collected from the freeness tester was measured for turbidity as an indication of the effectiveness of the samples to aid retention of the pulp fiber and filler.

Tests Sample A was prepared by adding 10.0 ml of 5N sulfuric acid to a 291-g water solution of sodium silicate containing 2 wt % $SiO_2$ to lower the pH to 9.0. After aging for 5 minutes, aliquots were removed and diluted to 0.125 wt % $SiO_2$ for use in the tests.

Test Sample B was prepared utilizing the process of this invention by adding 10.0 ml of 5N sulfuric acid in which 0.68 g of aluminum sulfate $[Al_2(SO_4)_3 \cdot 18H_2O]$ had been dissolved to a 291-g water solution of sodium silicate containing 2 wt % $SiO_2$ reducing the pH to 8.0. The resulting polyaluminosilicate had a calculated $Al_2O_3/SiO_2$ molar ratio of 1:100. After aging for 5 minutes aliquots were removed and diluted to 0.125 wt % $SiO_2$ for use in the test; the results are shown in Table 4.

As can be seen from the data, PAS microgels of this invention (Sample B) allowed use of such microgels in paper making under acidic conditions and reached higher activity as retention/draining agents than polysilicate microgels of the prior art (Sample A; U.S. Pat. No. 4,954,220) without the addition of aluminum.

TABLE 4

| Furnish pH | Freeness(ml)/Turbidity | |
|---|---|---|
| | Sample A | Sample B |
| 8.0 | 585/29 | 650/26 |
| 7.0 | 570/32 | 615/29 |
| 6.0 | 535/55 | 610/25 |
| 5.0 | 525/73 | 610/36 |
| 4.1 | 500/82 | 545/61 |

EXAMPLE 5

Preparation of 2 wt % PAS Stable Microgel

A PAS solution was prepared by mixing 3934 g of a 2.1 wt % $SiO_2$ solution (as $Na_2O:3.2SiO_2$) with 144 ml of 5N $H_2SO_4$ containing 5.3 grams of $Al_2(SO_4)_3 \cdot 17H_2O$/liter of acid. The resulting 2 wt % polyaluminosilicate microgel solution was mixed for 5 minutes (pH=9.19). A portion of the 2 wt % solution was diluted to 0.5 wt % PAS with deionized water. The pH of a second portion of the 2 wt % solution was lowered to 2 using 98% $H_2SO_4$ and stored as 2 wt % PAS. The remainder of the original 2 wt % solution was stored without pH adjustment or dilution; it gelled in approximately 48 hr. Performance as a papermaking retention and drainage aid of the two microgel solutions was determined utilizing Canadian Standard Freeness tests using a 0.3% consistency, pH 8, bleached Kraft furnish containing 35% hardwood, 35% softwood and 30% precipitated calcium carbonate. Product performance was tested by adding to a paper furnish 20 lb/t (dry furnish basis) of BMB-40 cationic potato starch 15 seconds prior to the addition of the silica solutions. Mixing was conducted in a Britt Jar at 750 rpm and the flocculated furnish was then transferred to a Canadian Standard Freeness tester and drainage measurements were made. Silica doses of 0.5 and 1.0 lb/t ($SiO_2$ basis) were tested. Freeness results (in ml) are shown in Table 5.

TABLE 5

| | Freeness(ml) | |
|---|---|---|
| | when made | after 7 days |
| I. 0.5 lb/t silica | | |
| 0.5% PAS | 430 | 475 |
| 2.0% PAS, pH 2.0 | 490 | 540 |
| II. 1.0 lb/t silica | | |
| 0.5% PAS | 475 | 520 |
| 2.0% PAS, pH 2.0 | 550 | 625 |

As can be seen from these data, lowering the microgel pH can lead to stable, increased microgel concentrations and improved paper making performance.

EXAMPLE 6

A PAS solution was prepared by mixing 21 g of 3.22 ratio sodium silicate containing 28.5% $SiO_2$ with 260 grams of deionized water. To the resulting 2.1 wt % $SiO_2$ solution was added 9.84 ml of 5N $H_2SO_4$ solution containing 0.52 g of $Al_2(SO_4)_3 \cdot 17H_2O$. Aliquots of the resulting 2 wt % PAS solution ($SiO_2$ basis) were diluted and stabilized at 0.125 wt % PAS ($SiO_2$ basis) at pH 2.5 by diluting with 0.0085N $H_2SO_4$ solution at various times.

Average microgel sizes of the 0.125 wt % PAS ($SiO_2$ basis) samples were determined using a Brookhaven Instrument light scattering goniometer, model BI-200SM. Measurements were conducted at room temperature using an argon-ion laser with a wavelength of 488 nm operating at 200 mW power. Light scattering intensity measurements were made at different angles and the data were analyzed using a Zimm plot. Average microgel particle sizes were obtained from particle size distribution.

Performance of the 0.125 wt % PAS solutions as a papermaking retention and drainage aid was determined by conducting Canadian Standard Freeness tests using a 0.3 wt % consistency, pH 8, bleached Kraft furnish containing 35% hardwood, 35% softwood and 30% precipitated calcium carbonate. Product performance was tested by adding to the paper furnish 20 lb/t (dry furnish basis) of BMB-40 cationic potato starch 15 seconds prior to the addition of 2 lb/t of the PAS solutions ($SiO_2$ basis). Mixing was conducted in a Britt Jar at 750 rpm and the flocculated furnish was then transferred to a Canadian Standard Freeness tester and drainage measurements were made. Freeness results (in ml) and average silica particle (microgel) size (in nanometers) versus dilution time are shown in Table 6.

TABLE 6

| Dilution Time (minutes) | Freeness (ml) | Average Particle Size (nm) |
|---|---|---|
| 0.5 | 580 | 8.1 |
| 1 | 615 | 11.9 |
| 2 | 640 | 18.1 |
| 5 | 660 | 41.0 |
| 30 | 660 | 250 |
| 35 | 610 | 357 |
| 37 | 610 | 530 |
| 39 | 595 | 838 |

As can be seen from the data, microgel size in the range of this invention affords the best performance in paper making (as measured by freeness).

We claim:

1. A process for making paper comprising the steps of (a) adding to an aqueous paper furnish containing pulp and optionally inorganic filler, 0.01–1% by weight, based on the dry weight of the furnish, of a water soluble polyparticulate polyaluminosilicate microgel having a mole ratio of alumina:silica of between 1:10 and 1:1500 prepared by a process comprising the steps of
  (i) acidifying an aqueous solution of an alkali metal silicate containing 0.1–6% by weight of $SiO_2$ to a pH of 2–10.5 by adding an aqueous acidic solution containing sufficient aluminum salt to provide said mole ratios; and
  (ii) adjusting the pH of the product of step (i) to between 1–4 before, after or concurrently with a dilution step, but prior to gelation, to achieve a $SiO_2$ content of $\leq 5\%$ by weight; and at least approximately 0.001% by weight, based on the dry weight of the furnish, of a water soluble cationic polymer;

wherein the microgel has an average particle size of 20–250 nm; and (b) forming and drying the product of step (a).

2. A process for making paper comprising the steps of (a) adding to an aqueous paper furnish containing pulp and optionally inorganic filler a water soluble polyparticulate polyaluminosilicate microgel consisting essentially of
  (i) microgels having mole ratios of alumina:silica of between 1:25 and 1:1500 wherein aluminum ions are present both intra- and inter-particle and wherein the particles of the microgel have diameter of 1–2 nm; and
  (ii) water such that the microgels are present at $\leq 5\%$ by weight based on $SiO_2$ content and at a pH of 1–4, and at least approximately 0.001% by weight based on the dry weight of the furnish of a water soluble cationic polymer;

wherein the microgel has an average particle size of 20–250 nm; and (b) forming and drying the product of step (a).

3. The process of claim 2 wherein there is an additional amount of aluminum compound added to the paper furnish.

4. The process of claim 1 wherein there is an ionic polymer added to the paper furnish.

* * * * *